US005584110A

United States Patent [19]

Mordoch

[11] Patent Number: 5,584,110

[45] Date of Patent: Dec. 17, 1996

[54] GARBAGE DISPOSAL INSTALLATION TOOL

[76] Inventor: David Mordoch, 2121 Cloverfield Blvd. Ste. 203, Santa Monica, Calif. 90404

[21] Appl. No.: 389,237

[22] Filed: Feb. 15, 1995

Related U.S. Application Data

[63] Continuation-in-part of Ser. No. 304,780, Sep. 12, 1994.

[51] Int. Cl.[6] ........................ B23P 19/04

[52] U.S. Cl. ........................ 29/229; 29/225; 29/227; 29/235; 29/450

[58] Field of Search ........................ 29/229, 235, 263, 29/280, 282, 450, 453, 225, 227

[56] References Cited

U.S. PATENT DOCUMENTS 3,154,256 10/1964 Bebinger ........................ 241/46.016

3,319,325 5/1967 Nessamar et al. ........................ 29/235

4,142,283 3/1979 Walker et al. ........................ 29/227

*Primary Examiner*—Bruce M. Kisliuk

*Assistant Examiner*—Thomas W. Lynch

*Attorney, Agent, or Firm*—Denton L. Anderson; Sheldon & Mak, Inc.

[57] ABSTRACT

A tool is provided which facilitates the installation of a standard garbage disposal unit. The tool allows the installer to set the hanger frame around the sink opening sleeve without having to hold down the sink opening sleeve while attaching the circular spring to the lower end of the sink opening sleeve. The tool of the invention has a lower portion with frustoconical side to facilitate the expansion of the circular spring. The tool also has an upper portion which is generally cylindrical and which fits up into the lowermost end of the sink opening sleeve. Snap-on devices, such as spring-and-ball detents, are disposed around the upper portion of the tool to engage the tool to the annular lip at the lowermost end of the sink opening sleeve.

13 Claims, 5 Drawing Sheets

GARBAGE DISPOSAL INSTALLATION TOOL

RELATED APPLICATION

This is a continuation-in-part application of U.S. patent application Ser. No. 08/304,780, filed Sep. 12, 1994, the entirety of which is incorporated herein by reference.

FIELD OF THE INVENTION

This invention relates generally to the field of plumbing tools and accessories and, specifically, to a tool for installing household garbage disposals.

BACKGROUND

The installation of a garbage disposal unit is, at present, an extremely awkward and difficult task. This is because conventional garbage disposals are suspended from a hanger frame which is attached to a sink opening sleeve (sometimes called a strainer flange) on the underside of the sink. The hanger frame is held to the sink opening sleeve by a stiff circular spring (sometimes called a snap ring) which must be stretched over the bottom end of the sleeve and positioned within an annular groove on the sleeve. The job generally requires manually maintaining the hanger frame in place around the sink opening sleeve while stretching the stiff circular spring over the bottom end of the sink opening sleeve. The job must be accomplished in the tight confines of the area immediately below the sink. This task is very difficult for one individual and it is common in the construction trades to employ two individuals to accomplish the task.

Accordingly, there is a need for an inexpensive and easy-to-use tool for placing the circular spring into the annular groove on the exterior of a sink opening sleeve. Moreover, there is a need for such a tool which will eliminate the requirement of manually maintaining the hanger frame around the sink opening sleeve while the circular spring it attached.

SUMMARY

The invention satisfies these needs. The invention is an inexpensive and easy-to-use tool which, not only facilitates installation of the circular spring, but does so in a manner which does not require the manual retaining of the hanger frame around the sink opening sleeve.

The tool of the invention is useful in installing a garbage disposal unit below a sink opening using a hanger frame, a sink opening sleeve and a circular spring, wherein the sink opening sleeve has a lowermost edge with an inwardly directed radial lip and an annular groove above the lip dimensioned and shaped to accept and retain the circular spring. The tool of the invention has an upper end, a lower end, and a longitudinal axis. This tool further comprises an exterior surface having a lower moiety and an upper moiety. The lower moiety has a lowermost end and an uppermost end and defines a frustoconical section which flares outwardly from the lowermost end toward the uppermost end. The uppermost end terminates in a plane which is perpendicular to the longitudinal axis of the tool.

The upper moiety also has a lowermost end and an uppermost end. The upper moiety defines a generally cylindrical-shaped section having a longitudinal axis which is coincident with the longitudinal axis of the tool. The upper moiety is concentrically disposed within the uppermost end of the lower moiety with the uppermost end of the upper moiety terminating at a greater elevation than that of the plane and the lowermost end of the upper moiety terminating at a lower elevation than that of the plane.

The tool of the invention also comprises a snap-on engagement retainer disposed along the upper moiety for releasably retaining the upper moiety within the sink opening sleeve by engaging the annular lip. The snap-on engagement retainer is disposed so that, when the upper moiety is inserted upwards into the sink opening sleeve and the upper moiety is retained within the sink opening sleeve, the elevation of the annular groove is approximate to the first plane, so that the circular spring can be slipped off of the uppermost edge of the lower moiety directly into the annular groove.

DESCRIPTION OF THE DRAWINGS

These and other features, aspects and advantages of the present invention will become understood with reference to the following description, appended claims and accompanying drawings where:

DESCRIPTION OF THE INVENTION

Figure 4:
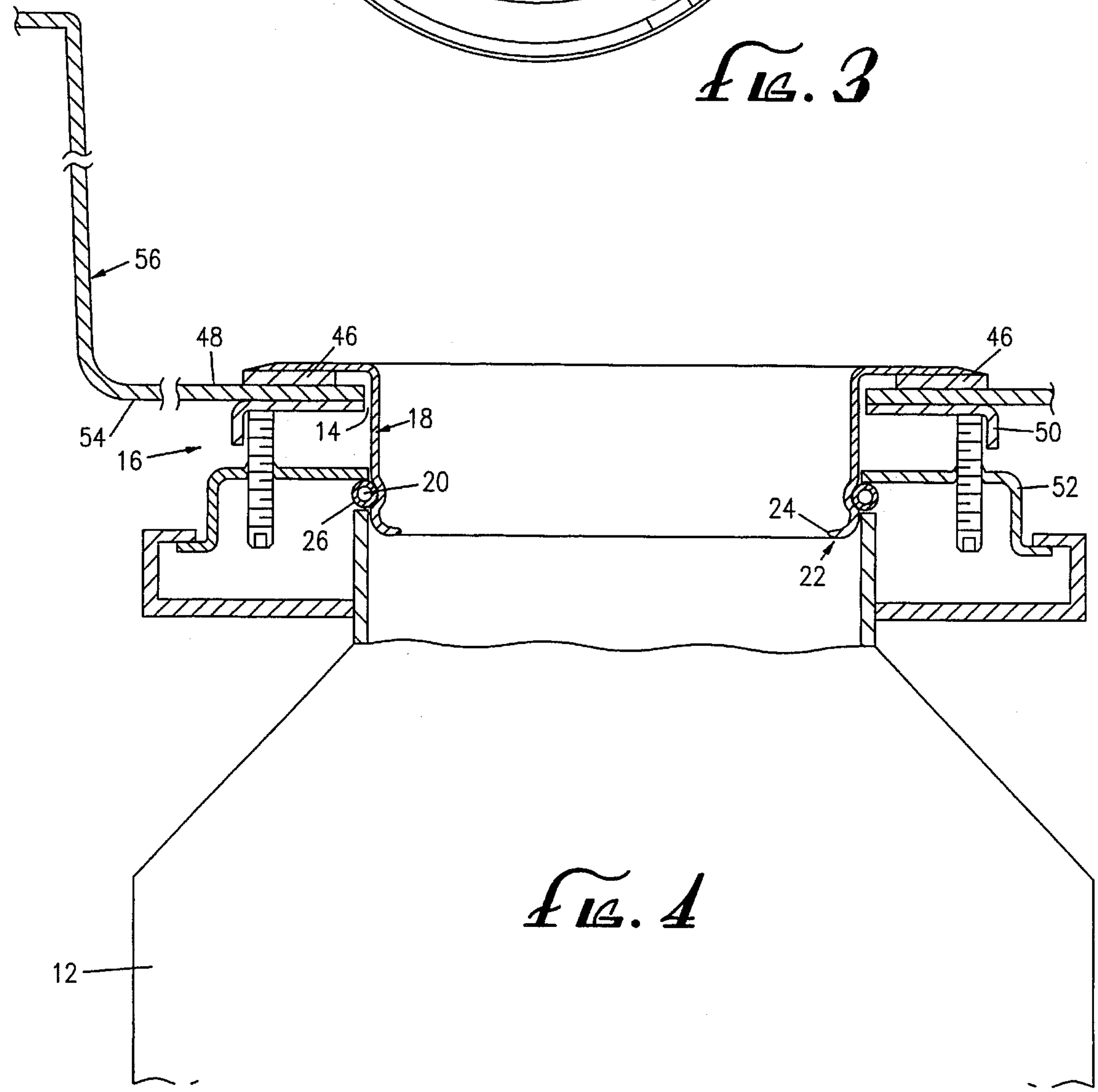
FIG. 4 is a side view in partial cross section showing a typical garbage disposal installation.

The tool of the invention 10 is useful in installing a garbage disposal unit 12 below a sink opening using a hanger frame 16, a sink opening sleeve 18, and a circular spring 20. A typical garbage disposal unit installation is shown in FIG. 4. The sink opening sleeve 18 has a lowermost edge 22 with an inwardly directed radial lip 24 and an annular groove 26 above the lip 24 dimensioned and shaped to accept and retain the circular spring 20.

The tool of the invention 10 comprises an exterior surface 28 and a snap-on engagement retainer 27. The tool 10 has a longitudinal axis 30.

The exterior surface 28 has a lower moiety 32 and an upper moiety 34. The lower moiety 32 has a lowermost end 36 and an uppermost end 38 defining a frustoconical section which flares outwardly from the lowermost end 36 towards the uppermost end 38.

The uppermost end 38 of the lower moiety 32 terminates in a plane 39, which is generally perpendicular to the axis 32 of the tool 10.

The lowermost end 36 has a cross-sectional diameter which is smaller than the internal diameter of the circular spring 20. In a typical embodiment, the cross-sectional diameter of the lowermost end 36 of the lower moiety 32 is between about 2.7 and about 3.2 inches.

In a typical embodiment, the uppermost end 38 of the lower moiety 32 has a circular cross-section with an outside diameter which is slightly less than that of the annular groove 26, but which is greater than the internal diameter of the hanger frame 16. The cross-sectional diameter of the uppermost end 38 of the lower moiety 32 is also slightly greater than the external diameter of the sink opening sleeve 18 at the annular groove 26. In a typical embodiment, the cross-sectional diameter of the uppermost end 38 of the lower moiety 32 is between about 3.3 and about 3.7 inches.

The upper moiety 34 of the exterior surface 28 also has a lowermost end 40 and an uppermost end 42. The upper moiety 34 defines a generally cylindrically-shaped section having a longitudinal axis 44 which is coincident with the longitudinal axis 30 of the tool 10 as a whole. The upper moiety 34 is concentrically disposed within the uppermost end 38 of the lower moiety 32 with the uppermost end 42 of the upper moiety 34 terminating at a greater elevation than that of the first plane 39 and the lowermost end 40 of the upper moiety 34 terminating at a lower elevation than that of the first plane 39. In a typical embodiment, the uppermost end 42 of the upper moiety 34 terminates at an elevation which is greater by at least 0.2 inches than the first plane 39 and the lowermost end 40 of the upper moiety 34 terminates at a lower elevation by at least about 0.2 inches than that of the first plane 39.

The cross-sectional diameter of the lowermost end 40 of the upper moiety 34 is slightly less than the external cross-sectional diameter of the lowermost edge 22 of the sink opening sleeve 18. This allows the lowermost edge 22 of the sink opening sleeve 18 to slip around the upper moiety 34. The internal diameter of the uppermost end 38 of the lower moiety 32 has a cross-sectional diameter which is slightly greater than the external diameter of the lowermost edge 22 of the sink opening sleeve 18. In a typical embodiment, the cross-sectional diameter of the upper moiety is between about 2.8 and about 3.2 inches.

As shown in FIGS. 1–4, the snap-on engagement retainer can comprise a plurality of spring-and-ball detents 31 disposed in a plane parallel to that of the first plane 39. Preferably, the detents 31 are spaced apart from one another by equal angles. In a typical embodiment, the tool 10 will comprise three or four equally spaced apart detents 31.

The snap-on engagement retainer 27 can also comprise a resilient lip 33. In the embodiment shown in FIGS. 5 and 6, this is accomplished by manufacturing the upper moiety 34 from a relatively resilient material, such as a thin plastic, and then providing a plurality of slits 35 in the uppermost end 42.

Figure 5:
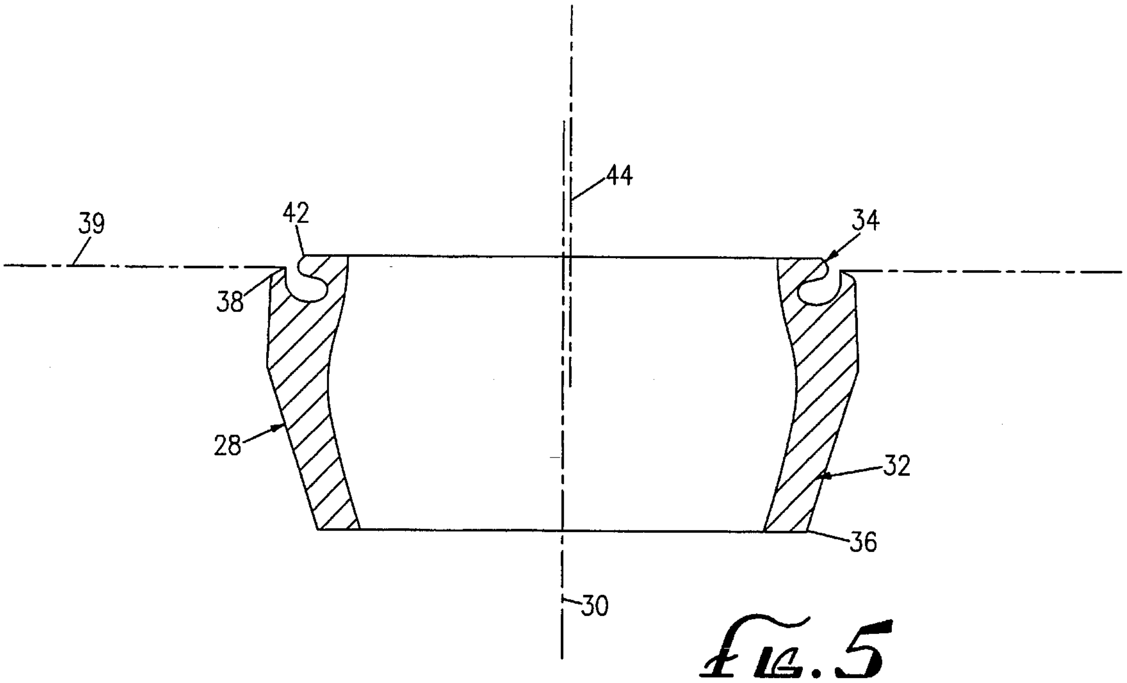
FIG. 5 is a side view in cross section of a second tool having features of the invention.
Figure 6:
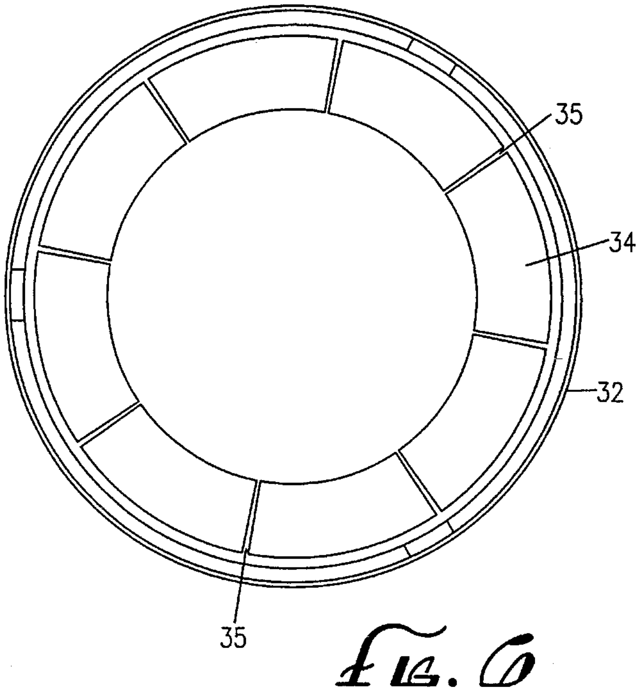
FIG. 6 is a top view of the tool of FIG. 5.
Figure 7:
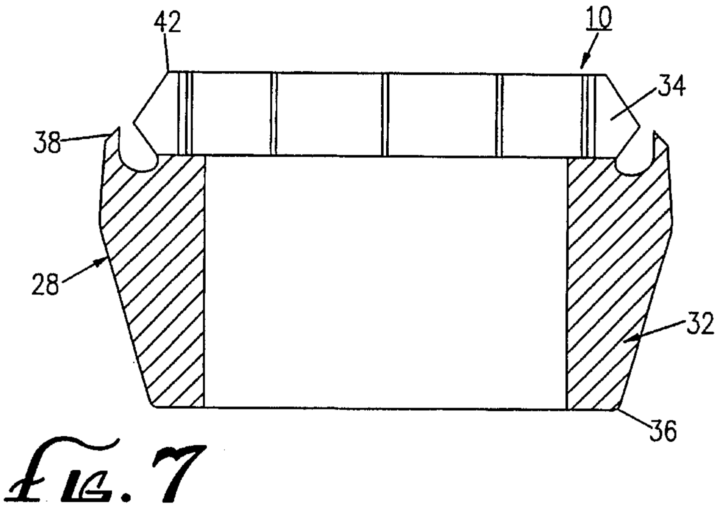
FIG. 7 is a side view in partial cross-section of a third tool having features of the invention.
Figure 8:
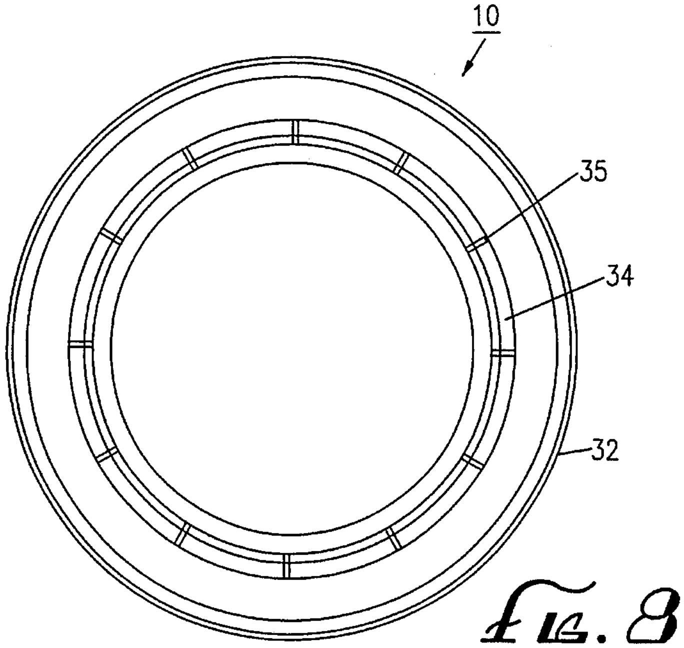
FIG. 8 is a top view of the tool of FIG. 7.

FIGS. 7 and 8 illustrate a variation on the embodiment shown in FIGS. 5 and 6. In this embodiment, the uppermost end 42 is thinner and more linear than the uppermost end 42 of the embodiment shown in FIG. 5. The alternate embodiment shown in FIGS. 7 and 8 is somewhat easier to snap on to and off of the sink opening sleeve 18. Other designs are possible, as well.

The snap-on engagement retainer 27 is disposed along the upper moiety 34 for releasably retaining the upper moiety 34 within the sink opening sleeve 18 by engaging the annular lip 24. The snap-on engagement retainer 27 is disposed so that, when the upper moiety 34 is inserted upwards into the sink opening sleeve 18, and the upper moiety 34 is retained within the sink opening sleeve 18, the elevation of the annular groove 26 is proximate to the first plane 39. This facilitates the insertion of the circular spring 20 into the annular groove 26 by merely slipping the spring 20 off of the uppermost end 38 of the lower moiety 32.

The tool 10 typically has an essentially unitary construction. Numerous suitable materials can be used in the tool 10. Metals, woods, and plastics can also be adapted for use as a construction material for the tool 10. Where the tool 10 is designed to be used over and over again, such as by professional plumbers, a smooth aluminum has been found to be an ideal material of construction. Where the tool 10 is designed for a one time use only, such as by do-it-yourselfers, a thin plastic material has been found to be an ideal material of construction. This is especially true for the embodiment shown in FIGS. 5–6 and FIGS. 7–8. Such a thin plastic embodiment is very conveniently provided to do-it-yourselfers in a kit which includes a garbage disposal unit.

Figure 1:
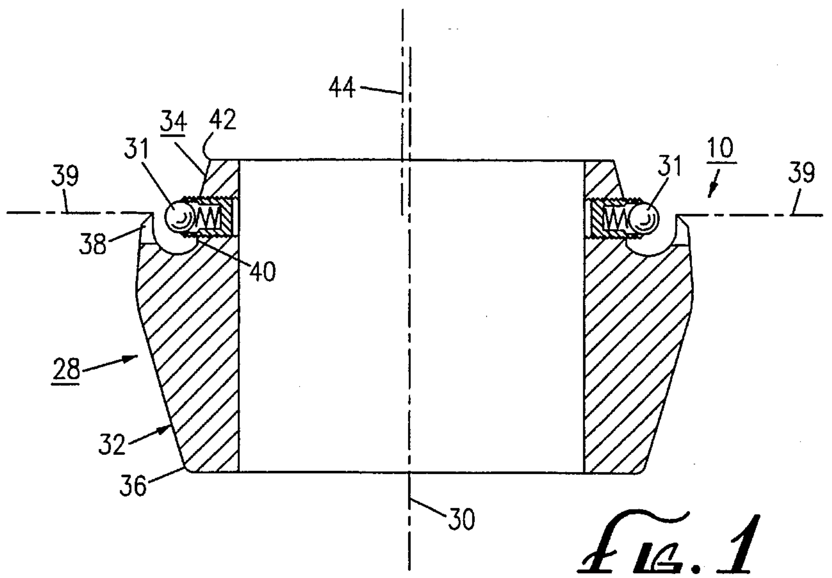
FIG. 1 is a side view in cross section of a tool having features of the invention.
Figure 2:
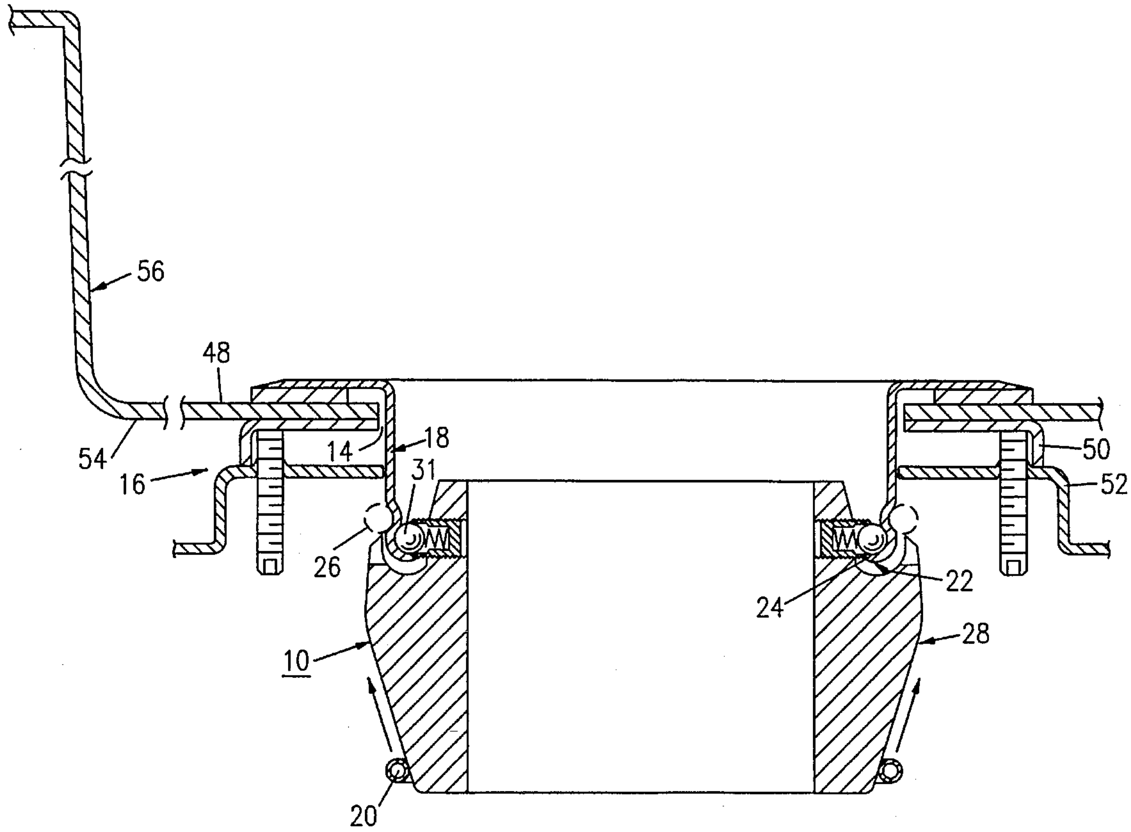
FIG. 2 is a side view in cross section of the tool of FIG. 1 as it is used to install a circular spring.
Figure 3:
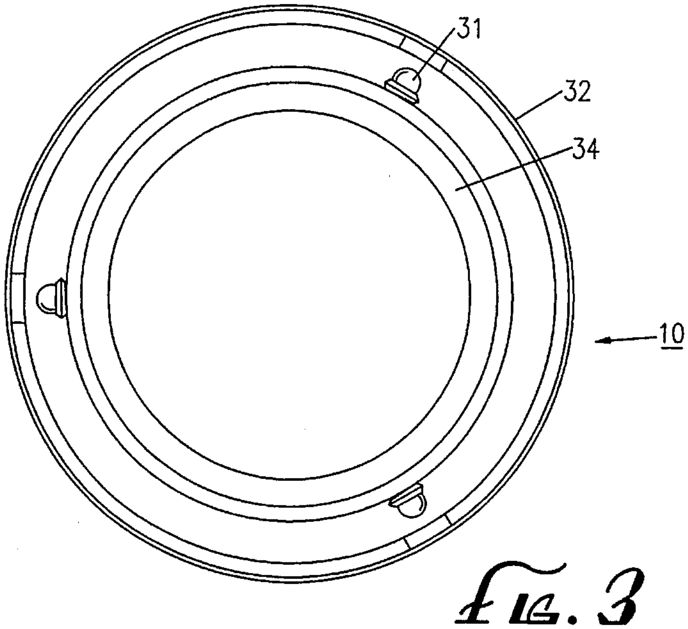
FIG. 3 is a top view of the tool of FIG. 1.

In operation, as shown in FIG. 2, the user of the tool 10 places the sink opening sleeve 18 within the sink opening 14. Usually, a gasket 46 is used to seal the sink opening sleeve 18 to the upper sink surface 48.

The hanger frame 16 generally comes in two parts, a backing plate 50 (sometimes called a back-up ring) and a hanger section 52 (sometimes called a mounting flange). The backing plate 50 is placed around the sink opening sleeve 18 to abut the underside 54 of the sink 56, and the hanger section 52 is placed around the sink opening sleeve 18 in abutment with the backing plate 50. As noted above, it is important that the maximum exterior diameter of the lower moiety 32 is greater than the inside diameter of the hanger 16. Specifically, it is important that the maximum diameter of the lower moiety 32 be greater than the inside diameter of the hanger section 52.

The tool 10 is then slipped onto the lowermost end of the sink opening sleeve 18 by positioning the upper moiety 34 of the tool 10 up into the sink opening sleeve 18 until the snap-on engagement retainer 27 attaches to the annular lip 24 at the lowermost edge 22 of the sink opening sleeve 18. With the snap-on engagement retainer 27 engaged, the tool 10 becomes affixed to the lowermost end of the sink opening sleeve 18 and retains the hanger frame 16 around the sink opening sleeve 18.

The circular spring 20 is slipped over the lowermost end 36 of the lower moiety 32 and then slid upwardly around the frustoconical surface of the lower moiety 32 until it is expanded to a diameter greater than that of the sink opening sleeve 18. It is then slid further upwardly until it slips off of the uppermost end 38 of the lower moiety 32 directly into the annular groove 26 in the sink opening sleeve 18.

Figure 9:
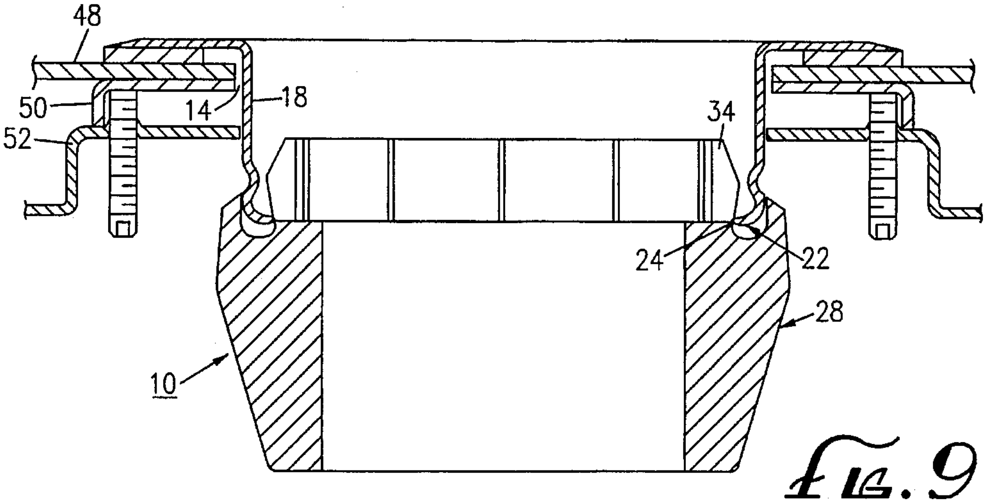
FIG. 9 is a side view in cross-section of the tool of FIG. 7 as it is used to install a circular spring.
Figure 10:
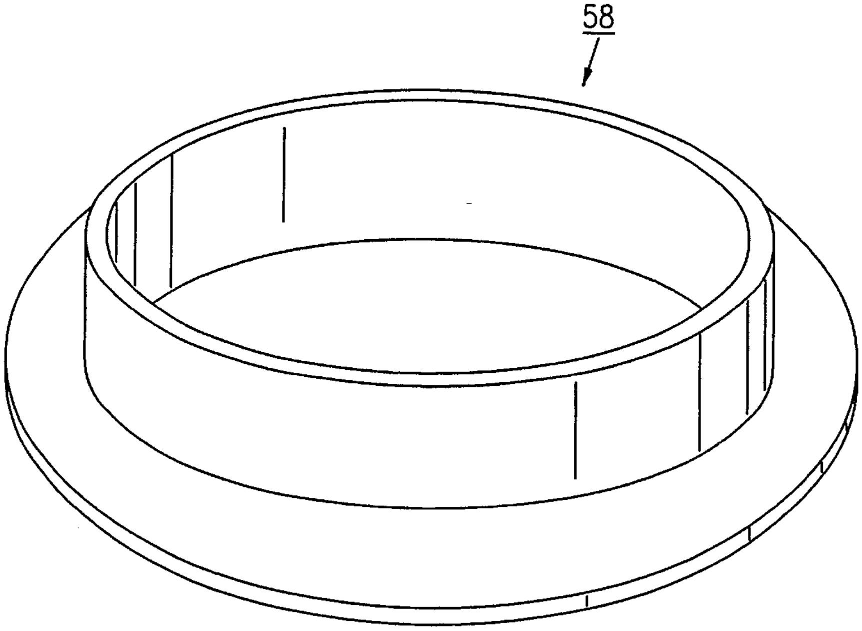
FIG. 10 is a perspective view of an extension fingers ring useful in the invention.
Figure 11:
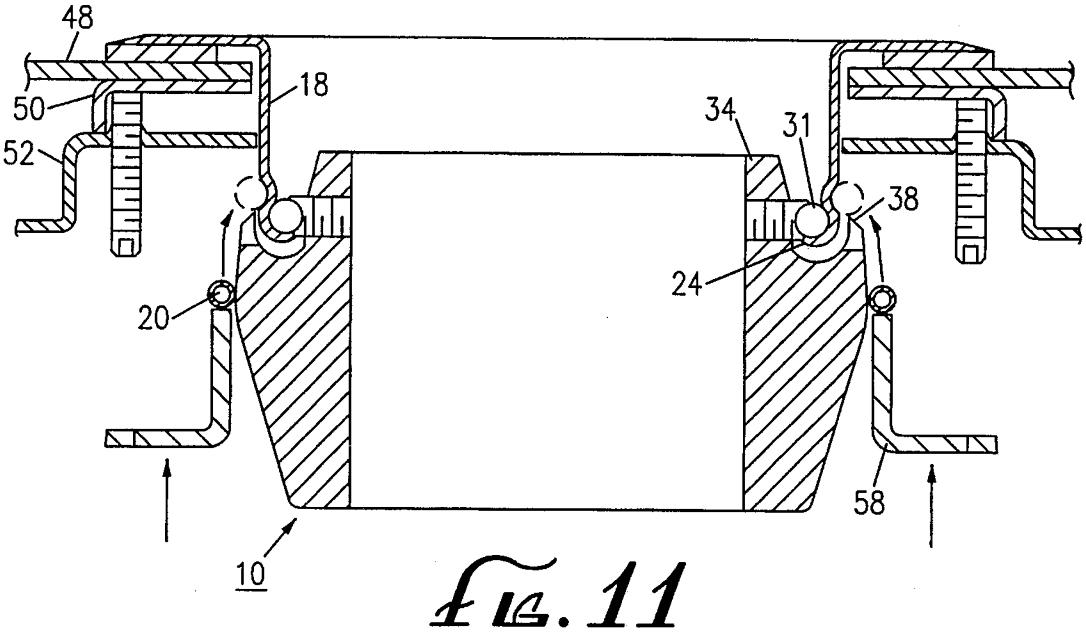
FIG. 11 is a side view in cross-section of an extension fingers ring of FIG. 10 as it is used to install a circular spring using the tool of FIG. 1.

In most cases, the user will find it relatively easy to slide the circular spring 20 upwardly around the frustroconical surface of the lower moiety 32 using the user's fingers alone. Occasionally, however, the conditions at the installation site will be too confining to allow the user to complete the sliding of the circular spring 20 into the annular groove 26 in the sink opening sleeve 18. Under such confined conditions, an extension fingers ring 58 such as shown in FIG. 9 can be used to slide the circular spring 20 upwards around the exterior surface of the tool 10 until it slips off of the uppermost end 38 of the lower moiety 32 into the annular groove 26. This procedure is illustrated in FIG. 10. In a typical embodiment, the extension fingers ring 58 has an inside diameter which is just slightly larger than the maximum outside diameter of the tool 10. The inside diameter of the extension fingers ring 58 must be smaller than the maximum outside diameter of the circular spring 20 as the circular spring 20 is slid along the outside surface of the tool 10 at the maximum diameter of the tool 10.

Once the circular spring 20 is in place within the annular groove 26, the tool 10 can be disengaged from the sink opening sleeve 18 by disengaging the snap-on engagement retainer 27 and pulling the tool 10 out from within the lowermost end of the sink opening sleeve 18. The hanger frame 16 is retained around the sink-opening sleeve 18 by the circular spring 20.

The garbage disposal 12 is then affixed to the hanger section 52 of the hanger frame 16 as shown in FIG. 4, and the installation is complete.

EXAMPLE

In an example of the tool of the invention, the tool is made from aluminum. It has a diameter at the lowermost end of the lower moiety of about three and one-sixteenth inch. It has a diameter at the uppermost end of the lower moiety of about three-and-one-half inches. It has a diameter at the uppermost end of the upper moiety of about three inches and it has a central bore with a diameter of about two inches. The height of the uppermost end of the upper moiety above the lowermost end of the upper moiety is about five-eighths of an inch.

Although the present invention has been described in considerable detail with reference to certain preferred versions, many other versions should be apparent to those skilled in the art. Therefore, the spirit and scope of the appended claims should not necessarily be limited to the description of the preferred versions contained therein.

What is claimed is:

1. A tool for installing a garbage disposal unit below a sink opening using a hanger frame, a sink opening sleeve and a circular springs the sink opening sleeve having a lowermost edge with an inwardly directed radial lip and an annular groove above the lip dimensioned and shaped to accept and retain the circular spring, the tool having an upper end, a lower end and a longitudinal axis, the tool comprising:

(a) an exterior surface having a lower moiety and an upper moiety:

(i) the lower moiety having a lowermost end and an uppermost end and defining a frustoconical section which flares outwardly from the lowermost end towards the uppermost end, the uppermost end terminating in a first plane which is perpendicular to the longitudinal axis of the tool;

(ii) the upper moiety having a lowermost end and an uppermost end and defining a generally cylindrical-shaped section having a longitudinal axis which is coincident with the longitudinal axis of the tool, the upper moiety being concentrically disposed within the uppermost end of the lower moiety with the uppermost end of the upper moiety terminating at a greater elevation than that of the first plane and the lowermost end of the upper moiety terminating at a lower elevation than that of the first plane; and (b) a snap-on engagement retainer disposed along the upper moiety for releasably retaining the upper moiety within the sink opening sleeve by engaging the radial lip, the snap-on engagement retainer being disposed so that, when the upper moiety is inserted upwards into the sink opening sleeve and the upper moiety is retained within the sink opening sleeve, the elevation of the annular groove is proximate to the first plane, so that the circular spring can be slipped off of the uppermost edge of lower moiety directly into the annular groove.

2. The device of claim 1 wherein the device is made from aluminum.

3. The device of claim 1 wherein the device is made from a plastic.

4. The device of claim 1 wherein the upper moiety has an external diameter between about 2.8 and about 3.2 inches.

5. The device of claim 1 wherein the hanger frame has an internal diameter and wherein the uppermost end of the lowermost moiety has an external diameter which is greater than the internal diameter of the hanger frame.

6. The device of claim 1 wherein the uppermost end of the lower moiety has an external diameter between about 3.3 inches and about 3.7 inches.

7. The device of claim 1 wherein the lowermost end of the lower moiety has an external diameter between about 2.7 and about 3.2 inches.

8. The device of claim 1 wherein the snap-on engagement retainer comprises a plurality of spring-and-ball detents.

9. The device of claim 7 wherein there are three or four spring-and-ball detents Spaced equally around the upper moiety.

10. The device of claim 1 wherein the snap-on engagement retainer comprises a resilient lip.

11. The device of claim 9 wherein the device is made from a resilient plastic and a plurality of slits are provided in the uppermost end of the device.

12. A kit comprising a tool and a extension fingers ring, the kit being useful for installing a garbage disposal unit below a sink opening using a hanger frame, a sink opening sleeve and a circular spring, the sink opening sleeve having a lowermost edge with an inwardly directed radial lip and an annular groove above the lip dimensioned and shaped to accept and retain the circular spring, the tool having an upper end, a lower end and a longitudinal axis, the tool comprising:

(a) an exterior surface having a lower moiety and an upper moiety:

(i) the lower moiety having a lowermost end and an uppermost end and defining a frustoconical section which flares outwardly from the lowermost end towards the uppermost end, the uppermost end terminating in a first plane which is perpendicular to the longitudinal axis of the tool;

(ii) the upper moiety having a lowermost end and an uppermost end and defining a generally cylindrical-shaped section having a longitudinal axis which is coincident with the longitudinal axis of the tool, the upper moiety being concentrically disposed within the uppermost end of the lower moiety with the uppermost end of the upper moiety terminating at a greater elevation than that of the first plane and the lowermost end of the upper moiety terminating at a lower elevation than that of the first plane; and (b) a snap-on engagement retainer disposed along the upper moiety for releasably retaining the upper moiety within the sink opening sleeve by engaging the radial lip, the snap-on engagement retainer being disposed so that, when the upper moiety is inserted upwards into the sink opening sleeve and the upper moiety is retained within the sink opening sleeve, the elevation of the annular groove is proximate to the first plane, so that the circular spring can be slipped off of the uppermost edge of lower moiety directly into the annular groove;

wherein:

(i) the circular spring has an inside diameter and an outside diameter;

(ii) the uppermost end of the lower moiety has a circular cross-section with a maximum external diameter;

(iii) the extension finger ring has an internal diameter and an external diameter;

(iv) the internal diameter of the extension fingers ring is only slightly larger than the maximum external diameter of the uppermost end of the lower moiety; and (v) the internal diameter of the extension fingers ring is less than the external diameter of the circular spring when the circular spring is stretched around the maximum diameter of the uppermost end of the lower moiety.

13. A kit comprising a tool and a garbage disposal unit, the tool being useful for installing the garbage disposal unit below a sink opening using a hanger frame, a sink opening sleeve and a circular spring, the sink opening sleeve having a lowermost edge with an inwardly directed radial lip and an annular groove above the lip dimensioned and shaped to accept and retain the circular spring, the tool having an upper end, a lower end and a longitudinal axis, the tool comprising:

(a) an exterior surface having a lower moiety and an upper moiety:

(i) the lower moiety having a lowermost end and an uppermost end and defining a frustoconical section which flares outwardly from the lowermost end towards the uppermost end, the uppermost end terminating in a first plane which is perpendicular to the longitudinal axis of the tool;

(ii) the upper moiety having a lowermost end and an uppermost end and defining a generally cylindrical-shaped section having a longitudinal axis which is coincident with the longitudinal axis of the tool, the upper moiety being concentrically disposed within the uppermost end of the lower moiety with the uppermost end of the upper moiety terminating at a greater elevation than that of the first plane and the lowermost end of the upper moiety terminating at a lower elevation than that of the first plane; and (b) a snap-on engagement retainer disposed along the upper moiety for releasably retaining the upper moiety within the sink opening sleeve by engaging the annular lip, the snap-on engagement retainer being disposed so that, when the upper moiety is inserted upwards into the sink opening sleeve and the upper moiety is retained within the sink opening sleeve, the elevation of the annular groove is proximate to the first plane, so that the circular spring can be slipped off of the uppermost edge of lower moiety directly into the annular groove.

* * * * *